5773X
W. E. Arnold,
Washing Machine.
Patented Jan. 11, 1830.
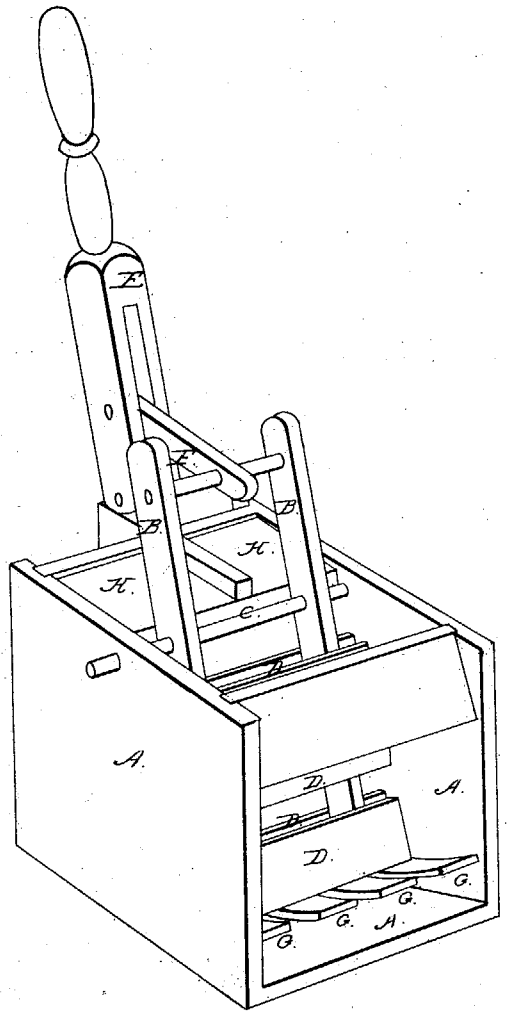
N. PETERS, PHOTO-LITHOGRAPHER, WASHINGTON, D. C.

X5773

Jan 11, 1830 21.

William C. Arnold of Haddam, county of Middlesex State of Connecticut

Letters Patent

The schedule referred to in these Letters Patent, and making part of the same, containing a description in the words of the said William C. Arnold himself of his improvement in a Machine for washing clothes —

---

To all, to whom these presents shall come: Be it Known, that I William C. Arnold of the town of Haddam, in the county of Middlesex and state of Connecticut, have invented a new & useful improvement in a Machine for washing clothes, & that the following is a full & exact description of the construction & operation of the said Machine as invented or improved by me —

This machine consists of a box fourteen inches long, twelve inches wide & twelve inches deep — At each end of the box & within it, is a piece of wood or plank five inches wide, one inch and a half thick on one side and brought down regularly so as to come to an edge on the other side — These pieces are fastened in the upper part of the box with the thin edges downwards, by means of nails, or by entering the ends of them in places cut for that purpose in the sides of the box — At an equal distance from each end of the box, near the top, is a pin one inch in diameter extending across the box & entering holes in the sides of the box — This pin passes thro' and supports two shafts of wood, eighteen inches long, two inches wide and one inch thick — The holes in the shafts, through which the pin passes are eight inches from one end of the shafts, and ten inches from the other — These shafts are six inches distant one from one from the other, and are calculated to move on the pin — On the longer or lower end of these shafts are four pieces of boards or plank, two on each side of the shafts fastened with nails — These pieces are so long as to extend across the inside of the box — The pieces at the ends of the shafts are three inches wide and one inch and a half thick on the side next the end of the shafts and bevelled or reduced to a thin edge on the other side. The other two pieces are six inches wide, five eighths of an inch thick on one side which adjoins the thin edge of the other pieces and bevelled or brought to a thin edge on the other side. This forms a dasher or washer & moves in the box. Near the upper end of the shafts is a pin half an inch in diameter which connects the shafts. At one end of the box on the outside is a post or upright, one inch and a half square, & rising six inches above the top of the box. This post is in the centre of the end and fastened to it by screws. On the upper end of the post is a tenon an inch in length and half an inch thick. This tenon is inserted in a jaw or opening half an inch wide & five inches long in the lower end of a stick eighteen inchs long and standing upon the post. A pin connects the tenon with the jaw. The upper end of the stick on the post is work'd properly for a handle for eight or ten inchs & the remaining part of it is square & of the same dimensions as the post. The lower end of it is a little rounded. From the upper end of the opening or jaw an arm or pitman eight inches long, secured in the jaw by a pin, extends to the pin, which joins the top of the shafts and is connected with this pin by the pins passing thro' a hole in the end of the arm. At the bottom of the box, are four elastic pieces of wood a quarter of an inch thick and about three inches wide, extending from one end of the box to the other at a small distance from each other, resting on the bottom of the box in the middle and bent into a regular curve, corresponding with the circular motion of the bottom of the dasher. When the machine is in operation, the ends of these pieces press against the ends of the box and in that way keep their place. Upon the top of the box is a cover in two parts which may be taken off at pleasure. Near one corner is an orifice for letting off the water when necessary. In using this Machine the clothes are put into the box on each side of the washer and the washer is put into motion by moving the handle of the stick on the top of the post, backwards & forward with the hand. By this means the clothes are pressed against the ends of the box also the pieces of wood or plank at the ends and are made clean – The dimensions of the Machine may be varied – It may be made on a large scale & put in motion by water or other suitable power The bottom of the box may be without the elastic piece and consist of one solid piece properly curved from one end to the other – The ends of the box may be so placed as to make an acute angle with the bottom on the inside, & thus to dispense with the pieces of plank on the ends – The Machine may be constructed with two or more dashers each of which may be moved by a separate power in the method above described. Or two dashers may be moved by a single power by erecting two posts at the end of the box at a suitable distance from each other, rising above the box supporting a pin passing thro' them and the middle of the jaw or opening, and by adding another arm or pitman to go from the lower end of the jaw to the pin in a second pair of shafts –

The machine may be made double by attaching another similar to the one above described to the end of it so as to be operated upon by the same power. The dasher may be varied in its construction. The boards may be of an even thickness or thicker at one end & placed lengthwise of the shafts with the thicker end down, and fastened to cross pieces joining the shafts – This machine may be put in motion by means of a crank at one end of the box connected with the pitman or arm, or instead of a pitman, with the band and rollers – In the latter case a roller is placed at each end of the box one of them turning on a fixed pin & the other fixed on a crank & turning with it & the band is fastened at one end to the fixed roller & at the other to the pin near the top of the shafts of the dasher & passing round the rollers. A double or triple crank may be used for the purpose of moving two or more dashers. What I claim as new in the above described Machine & that for which I ask an exclusive privilege is the arrangement and putting together of the various parts which constitute the same in the manner above specified & the application thereof & of the powers and principles embraced in the operation of said machine in the form and method above set forth and described, to the purpose of washing clothes – In Witness

X5773 whereof I have hereunto set my hand and seal this 16th day of December A.D. 1829

Witness

Thomas Foot }
Charles Foot }

William E. Arnold

Exd. Mfd.

[1400 ac.

Drawing Made from Inspection